(12) United States Patent  
Brandtner et al.

(10) Patent No.: US 9,380,877 B2  
(45) Date of Patent: Jul. 5, 2016

(54) READY TO ASSEMBLE FURNITURE SYSTEM

(71) Applicant: Ashley Furniture Industries, Inc., Arcadia, WI (US)

(72) Inventors: Timothy A. Brandtner, Ettrick, WI (US); Walter Wang, Kunshan (CN); Nicholas J. Robinson, Ettrick, WI (US); Christopher J. Lejcher, Blair, WI (US)

(73) Assignee: Ashley Furniture Industries, Inc., Arcadia, WI (US)

( * ) Notice: Subject to any disclaimer, the term of this patent is extended or adjusted under 35 U.S.C. 154(b) by 423 days.

(21) Appl. No.: 13/684,441

(22) Filed: Nov. 23, 2012

(65) Prior Publication Data

US 2013/0320741 A1 Dec. 5, 2013

Related U.S. Application Data

(60) Provisional application No. 61/563,429, filed on Nov. 23, 2011, provisional application No. 61/621,236, filed on Apr. 6, 2012, provisional application No. 61/677,731, filed on Jul. 31, 2012.

(51) Int. Cl.
*A47C 4/02* (2006.01)
*A47C 17/02* (2006.01)
*F16B 12/22* (2006.01)

(52) U.S. Cl.
CPC . *A47C 4/02* (2013.01); *A47C 4/028* (2013.01); *A47C 17/02* (2013.01); *F16B 12/22* (2013.01); *A47B 2230/0081* (2013.01); *Y10T 29/49826* (2015.01)

(58) Field of Classification Search
CPC .......... A47C 4/02; A47C 4/028; A47C 17/02; A47B 2230/0081; F16B 12/22
USPC ............................................. 297/440.14, 248
See application file for complete search history.

(56) References Cited

U.S. PATENT DOCUMENTS 3,066,982 A * 12/1962 Brower .................... A47C 4/02
297/411.28
3,658,382 A * 4/1972 Anderson ................ A47C 4/02
297/248

(Continued)

FOREIGN PATENT DOCUMENTS

JP 2010-121670 A 6/2010
WO WO 94/17696 8/1994
WO WO 2010/115967 A1 10/2010

*Primary Examiner* — David R Dunn
*Assistant Examiner* — Tania Abraham
(74) *Attorney, Agent, or Firm* — Christensen Fonder P.A.

(57) ABSTRACT

A component interface assembly for attaching the individual subcomponents of an RTA furniture system. Each component interface assembly having an elongated alignment slot cut into one of the subcomponents of the RTA furniture kit and a retention element affixed to a second corresponding subcomponent such that the first and second subcomponents can be secured together by inserting the retention element into the alignment slot. The alignment slot is positioned on the first subcomponent such that positioning the retention element for insertion into the slot aligns the second subcomponent with the first subcomponent providing tool-less alignment and engagement of the subcomponents. The assembled components may have cutouts on confronting planar surfaces of the respective first and second subcomponents providing enhanced storage for shipping the RTA furniture components.

7 Claims, 21 Drawing Sheets

(56) References Cited

U.S. PATENT DOCUMENTS

| | | | | |
|---|---|---|---|---|
| 5,358,309 A | * | 10/1994 | Fedele | A47C 3/00 297/440.1 |
| 5,394,573 A | | 3/1995 | Laughlin et al. | |
| 5,407,250 A | * | 4/1995 | Prince | A47C 3/029 297/440.2 |
| 5,429,417 A | * | 7/1995 | Kim | A47B 47/005 297/440.1 |
| 5,551,757 A | * | 9/1996 | Glover | A47C 4/028 297/354.12 |
| 5,687,942 A | * | 11/1997 | Johnson | F16B 7/0433 248/223.41 |
| 5,755,489 A | * | 5/1998 | Rossman | A47C 3/34 297/338 |
| 6,241,317 B1 | * | 6/2001 | Wu | 297/440.23 |
| 7,314,251 B1 | * | 1/2008 | Lin | A47C 7/42 297/440.2 |
| 7,744,162 B2 | * | 6/2010 | Griggs, Jr. | 297/440.14 |
| 2009/0016807 A1 | | 1/2009 | Koch | |
| 2010/0254757 A1 | * | 10/2010 | Saul | A47C 4/02 403/404 |
| 2010/0270844 A1 | | 10/2010 | Hood | |

* cited by examiner

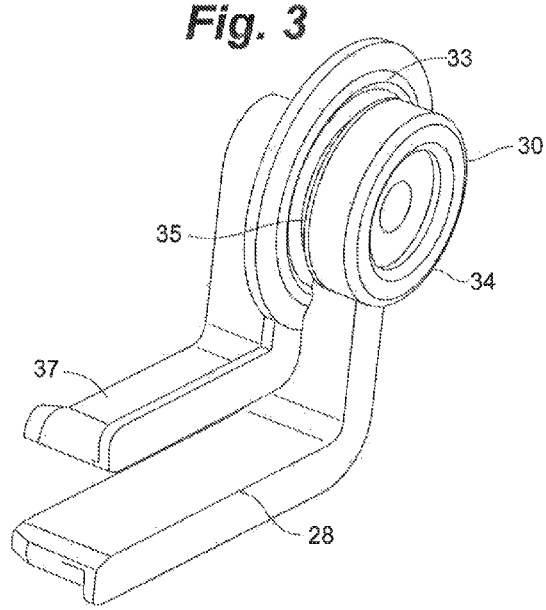
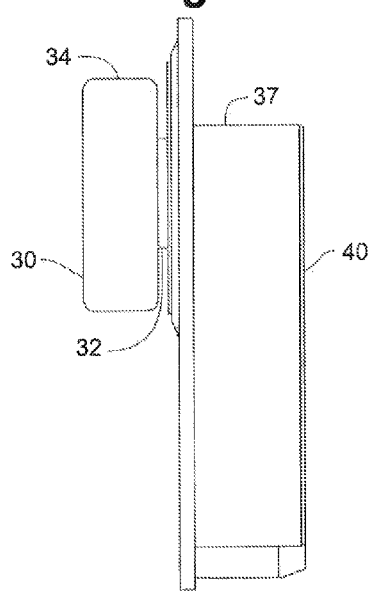

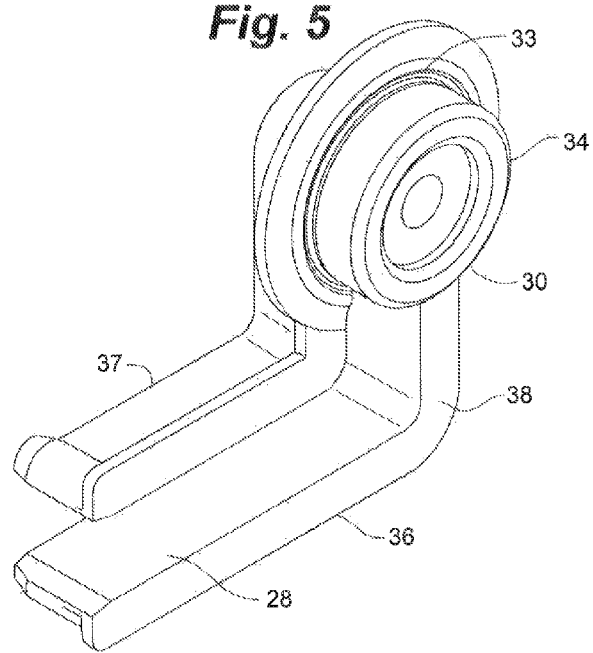
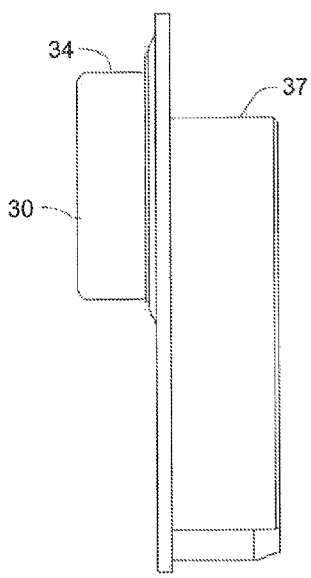

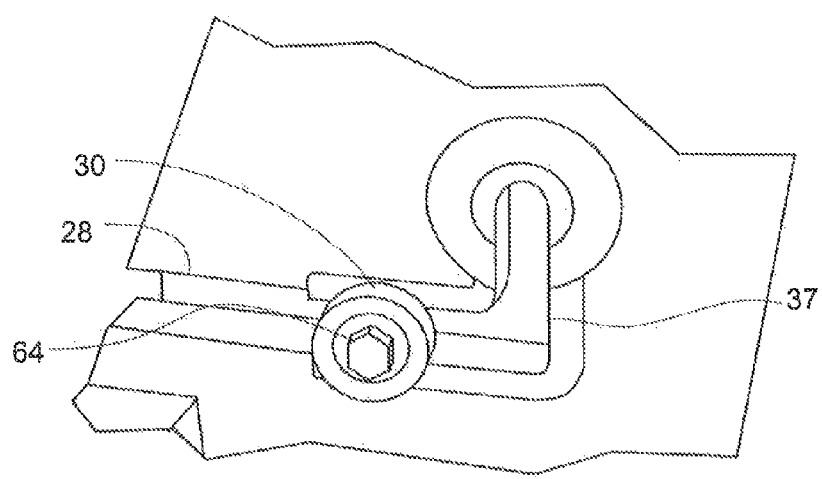
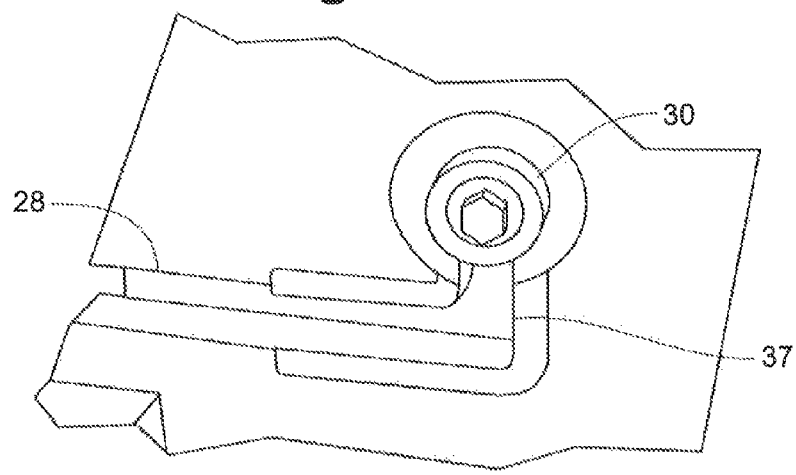

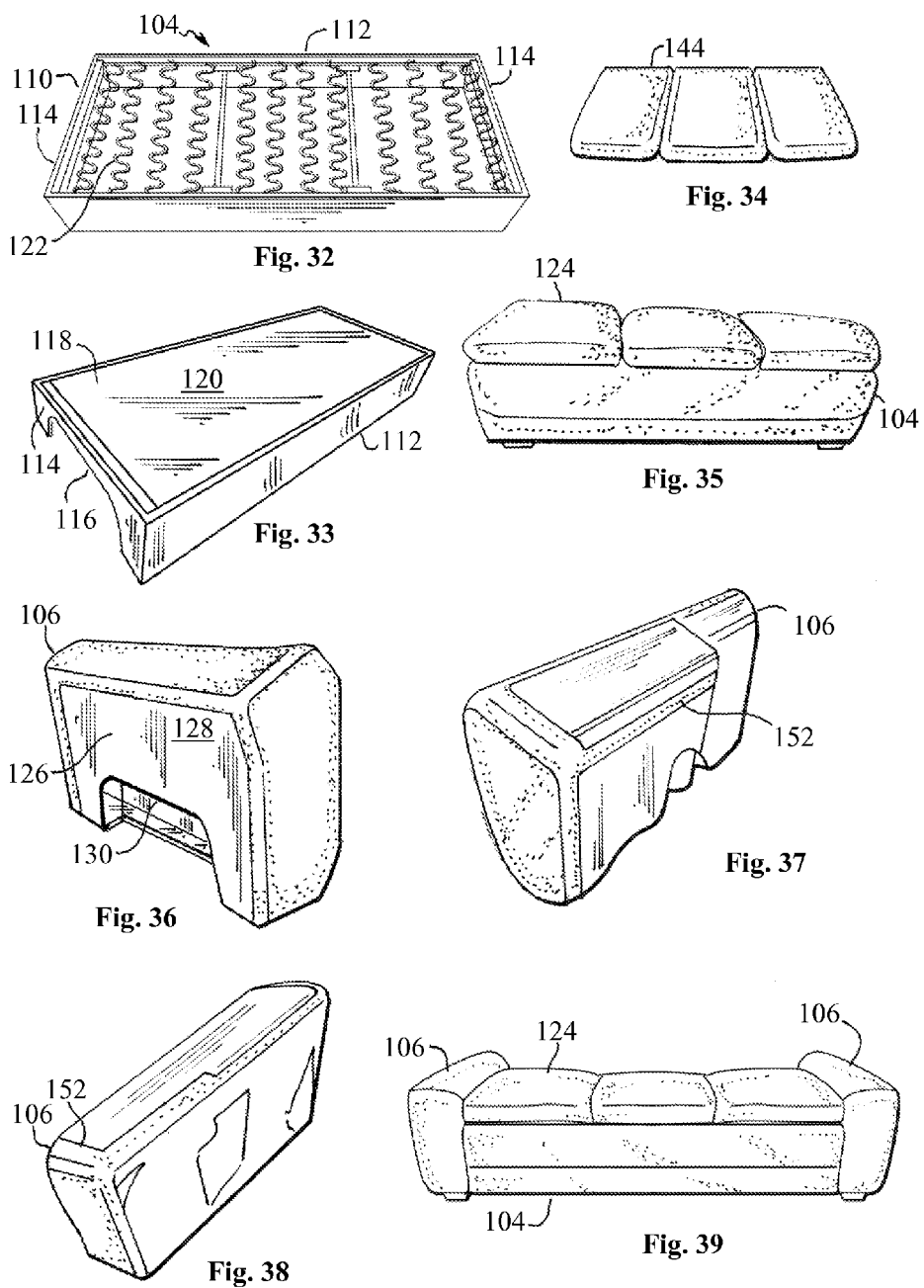

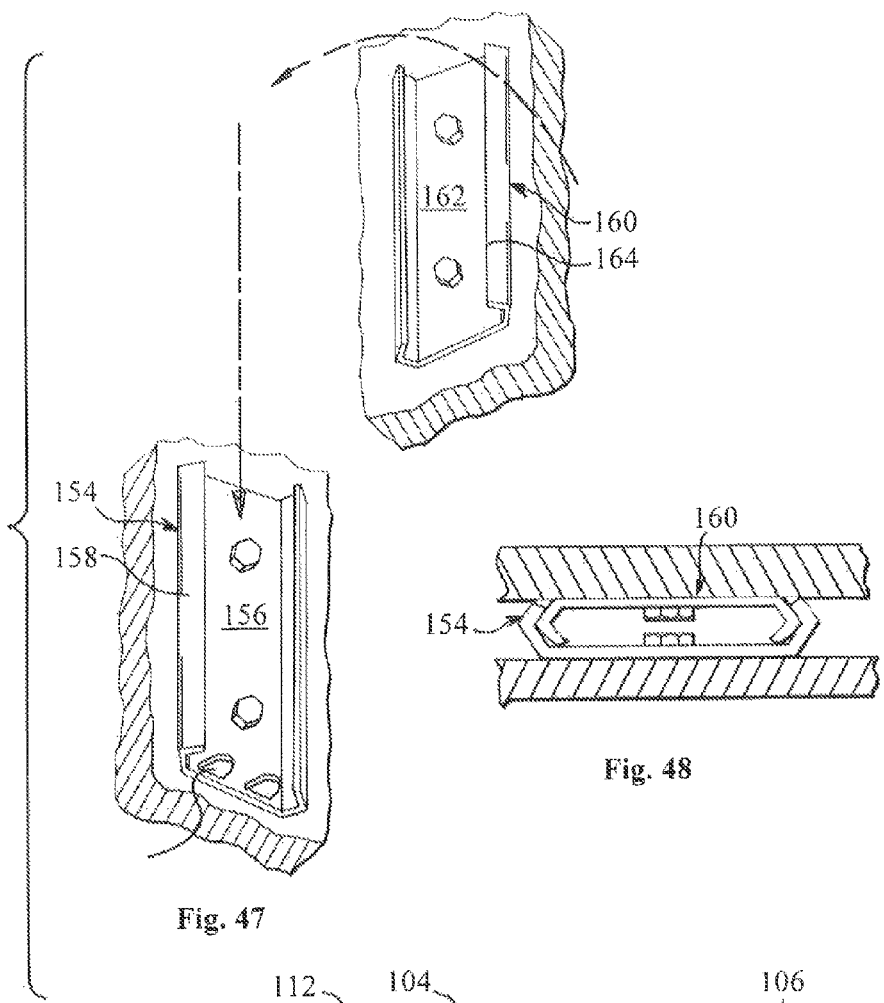
Fig. 47
Fig. 48
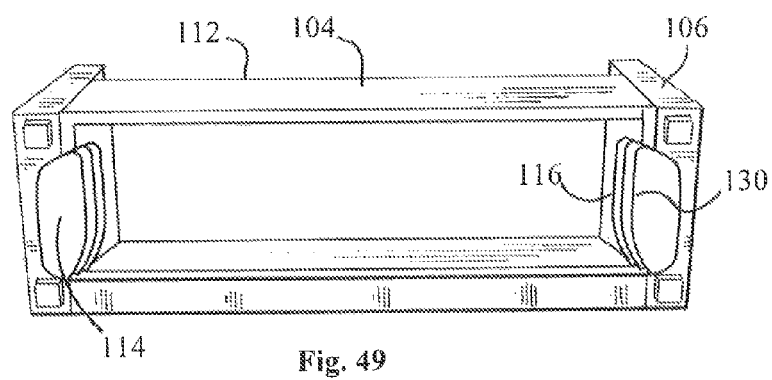
Fig. 49

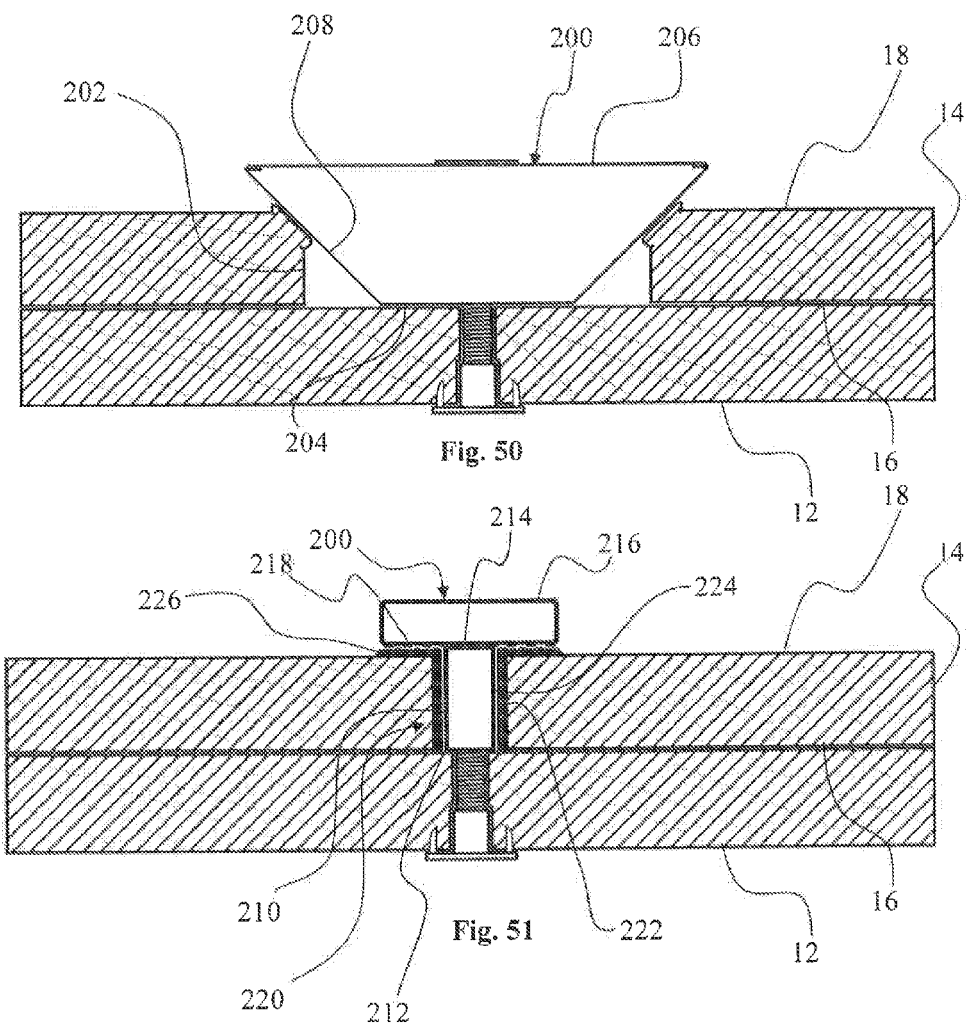

READY TO ASSEMBLE FURNITURE SYSTEM

RELATED APPLICATION

The present application claims the benefit of U.S. Provisional Application No. 61/563,429 entitled READY TO ASSEMBLE FURNITURE SYSTEM, filed Nov. 23, 2011; U.S. Provisional Application No. 61/621,236 entitled RTA FURNITURE WITH COMPONENT INTERFACE FEATURES, filed Apr. 6, 2012; and U.S. Provisional Application No. 61/677,731 entitled RTA FURNITURE WITH COMPONENT INTERFACE FEATURES, filed Jul. 31, 2012, all of which are incorporated herein by reference in their entirety.

FIELD OF THE INVENTION

The present invention is generally directed to interface components and related methods for securing together subcomponents of ready to assemble furniture systems. Specifically, the present invention is generally directed to interface components that align and secure subcomponents of ready to assembly furniture systems.

BACKGROUND OF THE INVENTION

Furniture items used for seating commonly comprise a support structure covered by upholstery and/or cushioning. In particular, sofas typically comprise a seat base, a back rest and at least one arm rest. A common aesthetic and practical design consideration is assembling the sofa to minimize the visible gaps between the subcomponents. Similarly, if the components are not properly aligned during assembly, the misaligned subcomponents can form an uneven edge between the subcomponents creating an unpleasant aesthetic appearance. Typically, the furniture item is fully assembled at the factory by factory workers or machinery to ensure the individual subcomponents are properly assembled and aligned to minimize the appearance of visible gaps or uneven edges in the assembled furniture item.

The inherent drawback of assembling the furniture item at the factory is that the L-shape of the back and seat rest assembly typical of the seating portion of sofas often prevents efficient packing of the furniture items for transport. Depending on the shape and size of subcomponents of the furniture item, inefficient packing of the furniture item can result in a significant amount of dead space within the shipping container or truck. In addition to increasing the cost of transportation, the dead space can allow the furniture items to shift during transport resulting in potential injury when the shipping containers are opened or damage to the furniture item itself. Similarly, the awkward shape of the assembled furniture items can make it difficult to navigate into or through a home or other structure without significant positioning and reorienting of the furniture item often resulting in injury to the movers and/or damage to the furniture or the structure.

An approach to addressing the drawbacks of factory assembled furniture items comprises providing individually upholstered subcomponents as a ready to assemble ("RTA") furniture kit that can be assembled by the end user. The individual subcomponents can be more efficiently packed than the fully assembled furniture item and allows the furniture item to be assembled in situ, thereby eliminating the need for navigating the assembled furniture item through the building. However, the inherent challenge of providing RTA furniture kits is that the consumers who assemble the furniture kits are typically unfamiliar with furniture assembly and may not have the experience or ready access to the tools necessary to properly assemble the subcomponents. In addition, manually aligning the often heavy and large subcomponents to install the fasteners for connecting the subcomponents can be difficult, particularly if a single individual is assembling the furniture item. Moreover, as the number of subcomponents assembled together increases, maneuvering the components becomes increasingly challenging as the weight and bulkiness of the assembly increases. A similar concern is that if the fasteners linking the subcomponents are not properly installed, the structural integrity of the furniture item could be compromised resulting in the furniture item collapsing possibly resulting in the injury of users.

Another challenge of RTA furniture kits is affixing fasteners to pre-upholstered furniture subcomponents can be difficult. With most RTA furniture kits, the interface surfaces between the various subcomponents are typically not easily accessible from the exterior of the furniture item following assembly. A common approach of accessing the interfacing surfaces is through the bottom of the seat box of the furniture item. However, this approach typically requires upending the couch and fastening the subcomponents while the furniture item is balanced on its side or back. The often awkward and precarious positioning of the furniture item during assembly can make alignment of the subcomponents even or more difficult. In particular, the awkward positioning can make the determination as to whether the subcomponents are properly aligned difficult. Similarly, if the fasteners are treaded through the pre-drilled holes, the awkward positioning of the subcomponents can create substantial friction making threading the subcomponents even more difficult.

Although there are numerous advantages to ready to RTA furniture systems, there is a need for an efficient means of assembling the subcomponents of the RTA furniture system by untrained or unskilled individuals while still providing an assembled furniture item that is aesthetically pleasing.

SUMMARY OF THE INVENTION

The present invention is generally directed to a ready-to-assemble furniture ("RTA") system in which each RTA furniture item comprises at least two subcomponents assembled by interfacing a connection bracket affixed to a first subcomponent and defining a tapered frustum surface with a corresponding slot defined by a second subcomponent. In embodiments, the frustum surface of the connection bracket engages the edges of the slot at an angle transverse to the slot surface of the second subcomponent defining the slot to prevent movement of the subcomponents transverse to the slot as well as separation of first and second subcomponents. The slot is positioned on the second subcomponent such that the engagement of the bracket to the slot properly aligns the first and second subcomponent.

In one aspect, the first subcomponent comprises a first planar or interface face and the second subcomponent comprises a second planar or interface face. In this configuration, a connection bracket is affixed to the first planar face of the first subcomponent. The connection bracket can comprise at least one of a conical frustum portion and a pyramidal frustum portion. The connection bracket can also define an inwardly facing lesser surface abutting the first planar surface and a outwardly facing greater surface opposite the lesser surface with a tapered frustum surface extending there between. Similarly, a slot corresponding to the connection bracket is cut in the second planar face of the second subcomponent, wherein at least one of the conical frustum portion and a rectangular pyramidal frustum portion is sized for an interference fit with the slot. In this configuration, the first subcomponent is affixed to the second subcomponent by inserting the bracket into the slot.

Each subcomponent may be box framed formed from boards or panelar members each formed of wood or wood products. "Panelar members" includes, for example, pieces of plywood or chip board or composite boards, or the like. The subcomponents may be part of chairs, including sofas, and may be arms, seat bases, and seat backs. The subcomponents may be upholstered or unupholstered. All of the subcomponents of a chair may be packaged in a box including instructions for assembly without tools and separate cushions for the seat and/or back.

In one aspect, the present invention is generally directed to a component interface assembly for attaching the individual subcomponents of an RTA furniture system. Each component interface assembly, according to an embodiment of the present invention, comprises an elongated alignment slot positioned on a first subcomponent and at least one interlocking retention element positioned on a second corresponding subcomponent, wherein the retention element is insertable into the slot to secure the first and second subcomponents together. The alignment slot is positioned on the first subcomponent such that positioning the retention element for insertion into the slot aligns the second subcomponent with the first subcomponent, thereby eliminating the need to maintain first and second subcomponent in alignment as the subcomponents are fastened together with conventional fasteners.

In one aspect, at least a portion of the alignment slot is vertically oriented when the assembled furniture item is oriented upright such that the first subcomponent must be lifted relative to the second subcomponent to slide the retention element along the slot to disengage the second subcomponent from the first subcomponent. Accordingly, the weight of the first subcomponent maintains the retention element in place within slot of the first subcomponent preventing accidental separation of the first and second subcomponents. In one aspect, the edges of the slot engage a portion of the retention element to provide a friction fit further improving retention of the retention element within the slot.

In one aspect, the slot can further comprise a polymer lining facilitating movement of the retention element through the slot without damaging the slot. Each slot is positioned on the second component such that the first and second components are properly aligned when the retention element is slid into the corresponding slot. In certain aspects of the present invention, the edges of the slots can be shaped to engage the retention elements as the retention element is being slid through the slot to adjust to the relative alignment of the subcomponents to correct minor misalignments between the subcomponents.

A component interface assembly, according to an embodiment of the present invention, comprises a retention element affixed to a first subcomponent and an alignment slot defined in a second subcomponent, wherein the retention element comprises a lug. The lug comprises a cylindrical body affixed to the first subcomponent at one end and having an engagement feature at the opposite end. The slot is sized such that the engagement feature engages the edges of the slot to lock the first and second subcomponents together when the lug is slid into the slot. Similarly, the width of the slot corresponds to the diameter of the cylinder such that the lug can be slid along the longitudinal axis defined by the slot, but not moved perpendicularly to the slot relative to the longitudinal axis.

In one aspect, the alignment slot can comprise at least two linear segments, wherein the segments are arranged in an L-shaped configuration. In this configuration, the first segment can define a generally horizontal axis when the first subcomponent is positioned in the ordinary upright orientation while the second segment can define a generally vertical axis. In operation, the second component can be moved horizontally such that the lug travels along the first segment until the lug reaches the second segment. The horizontal axis of the first segment can make positioning the retention element within the slot easier as the second subcomponent does not have to be vertically aligned with the lug, which can be challenging with heavier components such as back rests. The second component can be than be moved vertically manually or by gravity until the lug reaches the end of the second segment positioning the first and second components in the correct horizontal and vertical alignment.

In one aspect, the slot can comprise a polymer lining protecting the edges of the slot and facilitating the sliding of the lug through the slot to the end of the slot. The support structure of the subcomponents is often wood or plywood, which can slow the lug as the lug moves through the slot. In this configuration, the polymer lining can comprise a narrowed portion positioned at the end of the slot to grip the cylindrical body of the lug when the lug is slid to the end of the slot. In one aspect, the polymer lining can further comprise at least one protrusion extending outward from the slot to engage the engagement feature of the lug once the lug is slid to the end of the slot. The narrowed portion prevents the lug from moving backwards along the slot and disengaging the first and second subcomponents together.

A method of assembling a furniture item, according to an embodiment of the present invention, comprises cutting a slot in a first planar surface of a first furniture component and affixing a lug to a second planar surface of a second furniture component, wherein the first and second planar surfaces are positioned in parallel when the furniture item is assembled. The method further comprises cutting the slot such that at least a portion of the slot proximate to the end of the slot defines a vertical axis. Finally, the method comprises maneuvering the second subcomponent such that the lug is slid along the slot until lug reaches end of the slot, wherein the slot is retained at the end of the slot by the weight of the first subcomponent.

A component interface assembly, according to an embodiment of the present invention, comprises a retention element affixed to a first component and a corresponding alignment slot defined in a second component, wherein the retention element comprises an elongated bracket. The elongated bracket comprises an elongated body having a first face affixed against the first component and defining a protruding lip around a second face opposite the first face. In one aspect, the first face comprises a smaller cross-sectional area than the second face. The slot is sized such that the lip engages the edges of the slot when the elongated bracket is inserted into the slot to engage the first component to the second component. In this configuration, the bracket can comprise a V-shape, wherein the elongated bracket defines a tapered edge between the first face and the second face. In this configuration, the tapered edge engages the edge of the slot to retain the first component to the second component. The width of the slot corresponds to the width of the elongated body such that the bracket can be slid along the longitudinal axis defined by the slot, but not moved perpendicularly to the slot. The elongated body engages an elongated length of the edge of the slot to prevent the rotation of the second component around the bracket.

In one aspect, the slot can be oriented to define a linear vertical axis. In this configuration, the second component can be positioned such that the slot aligns with the elongated bracket before the second component is moved vertically to slide the bracket into the slot and engage the first and second components together. In one aspect, the elongated bracket can comprise a rounded end for simplifying alignment of the elongated bracket with the slot as the rounded end can engage the edge of the slot to shift the second component relative to the first component to correct minor misalignments between the subcomponents.

A method of assembling a furniture item, according to an embodiment of the present invention, comprises cutting a slot in a first planar surface of a first furniture component and affixing an elongated bracket to a second planar surface of a second furniture component, wherein the first and second planar surfaces are positioned in parallel when the furniture item is assembled. The method further comprises cutting the slot such that the slot defines a vertical axis. Finally, the method comprises maneuvering the second subcomponent such that the bracket is slid along the slot until the elongated bracket reaches end of the slot, wherein the slot is retained at the end of the slot by the weight of the first subcomponent.

A component interface assembly, according to an embodiment of the present invention, comprises a retention element affixed to a first component and a corresponding slot defined in a second component, wherein the retention element comprises a frustoconical bracket. The frustoconical bracket can comprise a frustoconical body having a first face with a cross-sectional area smaller than the opposing second face. The frustoconical body can also define a tapered edge extending between the first and second faces. The frustoconical bracket can be mounted to the first component such that first face is positioned against the corresponding surface of the first component such that the larger cross-sectional area of the second face is positioned away from the first component. In this configuration, the slot is sized such that the tapered edge of the frustoconical bracket engages the edges of the slot when the frustoconical bracket is inserted into the slot to engage the first component to the second component. In this configuration, at least two frustoconical brackets can be used affix the first component and the second component together such that the frustoconical brackets cooperate to prevent rotation of the first component relative to the second component around one of the frustoconical brackets.

In one aspect, the slot can be oriented to define a substantially vertical axis. The second component can be positioned such that the slot aligns with the frustoconical bracket before the second component is moved vertically to slide the bracket into the slot and engage the first and second components together. In this configuration, the rounded tapered edge of frustoconical bracket engages the edges of the slot to shift the second component horizontally to align the first and second components as the bracket is inserted into the slot. In one aspect, the slot can comprise tapered edges that engage the tapered edge of the frustoconical bracket to guide the frustoconical bracket as the bracket is slid into the slot to correct any misalignments between the first and second components.

A method of assembling a furniture item, according to an embodiment of the present invention, comprises cutting a slot in a first planar surface of a first furniture component and affixing a frustoconical bracket to a second planar surface of a second furniture component, wherein the first and second planar surfaces are positioned in parallel when the furniture item is assembled. The method further comprises cutting the slot such that the slot defines a substantially vertical axis. Finally, the method comprises maneuvering the second subcomponent such that the frustoconical bracket is slid along the slot until the elongated bracket reaches end of the slot, wherein the slot is retained at the end of the slot by the weight of the first subcomponent. In one aspect, the slot is cut to define a tapered edge to guide the frustoconical bracket into the slot and correct misalignments between the first and second subcomponents.

The present invention is directed to a RTA furniture kit having component interface features for tool-less alignment and assembly of the subcomponents. Each component interface feature can comprise a retention element affixed to a first subcomponent and a corresponding slot defined in the second subcomponent. The slots are positioned such that sliding the retention element through the corresponding slot aligns and engages subcomponents together. When the retention element is slid to the end of the slot, the retention element engages the parallel sides and end of the slot to prevent movement of the first subcomponent relative to the second subcomponent. The slot can be oriented such that gravity or friction will prevent relative movement of the first and second subcomponents such that the retention element travels back along the slot once the retention element is positioned at the end of the slot. In one aspect, the slot can further comprise a polymer lining facilitating movement of the retention element through the slot allowing for easy assembly and disassembly of the furniture item without damaging the slot.

A ready to assemble furniture kit, according to an embodiment, comprises a plurality of disassembled subcomponents with integrated component interfaces for tool-less assembly of the subcomponents, wherein at least one of the subcomponents comprises at least one retention element and at least subcomponent comprises at least one alignment slot corresponding to the retention element. The plurality of subcomponents can comprise a seat box with integrated arm rests and a back rest. In one aspect, each retention element comprises at least two t-shaped knobs receivable within each alignment slot to prevent torqueing of the back rest once the first subcomponent is engaged to the second subcomponent.

In one aspect, the plurality of subcomponents can further comprise at least one back rest cushion. In this configuration, the seat box can define an interior cavity sized to receive the back rest cushions when the kit is packaged. The seat box and each arm rest can define corresponding cutouts to combine the interior cavity defined by the set box and the interior cavities defined by each arm rest to increase the space within the seat box-arm rest assembly for receiving, for example, the back rest cushions and furniture components. According to an embodiment, the expanded space can be used to store oversized back or arm rest cushions that would otherwise not fit within the interior space of the seat box. The seat box can comprise an open bottom for accessing the interior cavities of the seat box and the arm rests via the cutouts.

In one aspect, the kit can further comprise at least one removable arm rest cushion affixable to the arm rest. An engagement mechanism, such as a zipper, is affixed to the exterior arm rest and releasably engagable to a corresponding engagement mechanism on each arm rest cushion. Alternatively, the arm rest cushion can be stored within the cavity defined by the arm rest when the kit is packaged.

A method of assembling a ready to assembly furniture kit, according to an embodiment of the present invention, comprises providing a seat box with integrated arm rests and having at least one alignment bracket defining a u-shaped slot, wherein each arm rest comprises an engagement mechanism. The method also comprises providing a back rest having at least one corresponding alignment bracket having at least one t-shaped knob receivable within the u-shaped slot of the seat box alignment bracket. The method further comprises storing at least one back cushion in a cavity defined within the seat box. The method can also comprises storing the back rest cushions in an expanded storage cavity defined by combining the interior cavities of the seat box and arm rests.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE CLAIMS

The invention can be completely understood in consideration of the following detailed description of various embodiments of the invention in connection with the accompanying drawings, in which:

FIG. 3 is a partial front perspective view of the component interface feature shown in FIG. 2.

FIG. 4 is a partial rear view of the component interface feature shown in FIG. 2.

FIG. 5 is a partial front perspective view of the component interface feature having a lug according to an embodiment of the present invention.

FIG. 6 is a partial rear view of the component interface feature shown in FIG. 5.

FIG. 11 is a representative perspective side view of a lug sliding horizontally along a polymer liner to engage two furniture components together according to an embodiment of the present invention.

FIG. 12 is a representative perspective side view of the lug depicted in FIG. 11 sliding vertically along a polymer liner to engage two furniture components together according to an embodiment of the present invention.

FIG. 32 is a top view of a seat box according to an embodiment of the present invention without an upper support surface removed.

FIG. 33 is a perspective view of the seat box depicted in FIG. 32 with the upper support surface installed.

FIG. 34 is a perspective view of a plurality of back rest cushions for a ready to assemble furniture kit according to an embodiment of the present invention.

FIG. 35 is a front perspective view of an upholstered seat box according to an embodiment of the present invention.

FIG. 36 is a side perspective view of an upholstered arm rest according to an embodiment of the present invention.

FIG. 37 is an enlarged partial perspective view of the upholstered arm rest depicted in FIG. 36.

FIG. 38 is a side perspective view of the upholstered arm rest depicted in FIG. 36.

FIG. 39 is a front perspective view of an arm rest-seat box assembly according to an embodiment of the present invention.

FIG. 47 is a diagram view of a bracket alignment assembly according to an embodiment of present invention.

FIG. 48 is a top cross-sectional view of the bracket alignment assembly depicted in FIG. 47.

FIG. 49 is a bottom view of a furniture item according to an embodiment of the present invention.

FIG. 50 is a cross-sectional side view of a portion of a furniture item according to an embodiment of the present invention.

FIG. 51 is a cross-sectional side view of a portion of a furniture item according to an embodiment of the present invention.

Figure 1:
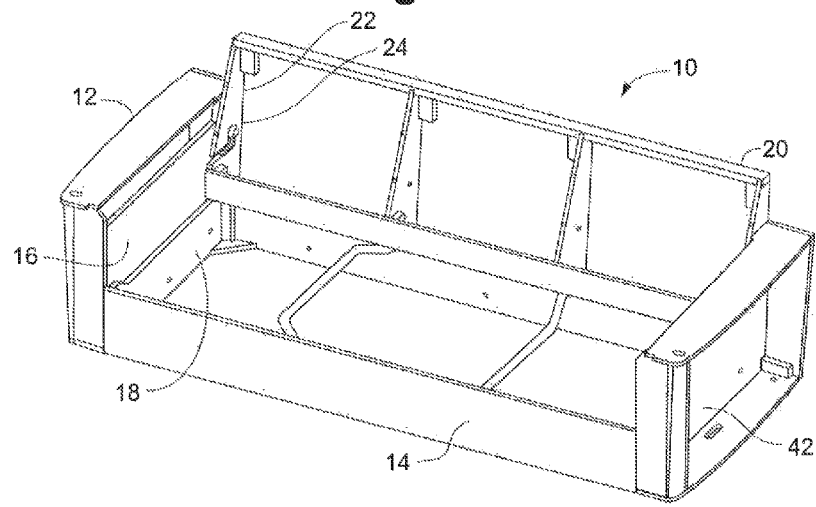
FIG. 1 is a front perspective view of an un-upholstered furniture frame for a furniture item according to an embodiment of the present invention.
Figure 2:
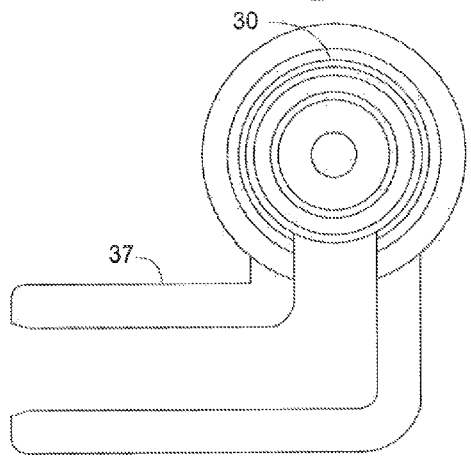
FIG. 2 is a partial side view of a component interface feature having a lug according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Figure 13:
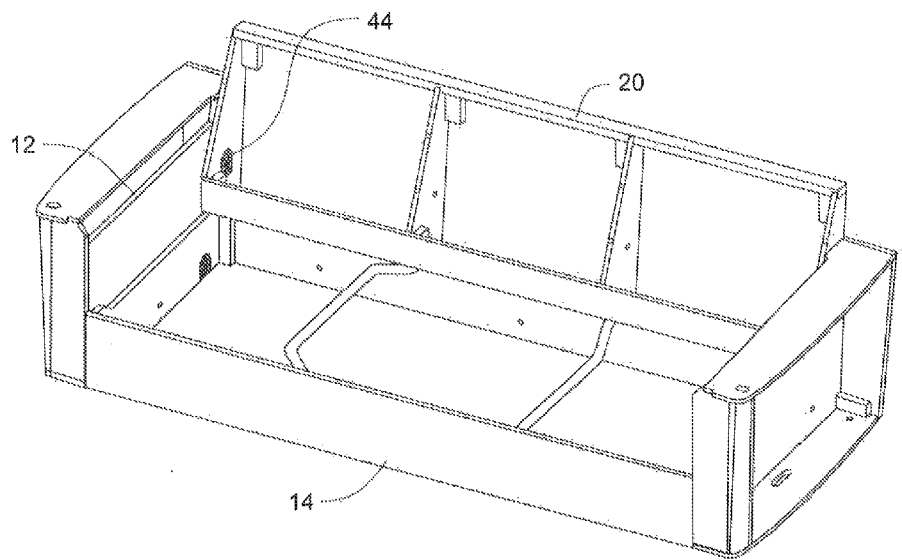
FIG. 13 is a front perspective view of an un-upholstered furniture frame for a furniture item according to an embodiment of the present invention.

As shown in FIGS. 1 and 13, a RTA furniture item 10, according to an embodiment, comprises a kit having at least a first subcomponent 12 and a second subcomponent 14. As depicted, the RTA furniture item 10 is directed to a RTA sofa kit, wherein the first subcomponent 12 is the arm rest and the second subcomponent 14 is the seat box. The present invention is not limited to sofas and can be applicable to any type of upholstered or partially upholstered furniture items including, but not limited to, chaises, sectionals, lounge chairs and recliners. Moreover, the assignment of the first subcomponent 12 to the arm rest and second subcomponent 14 to the seat box is intended to assist in the description of the present invention and not intended to be limiting. The first subcomponent 12 further comprises at least one first planar or interface surface 16. Similarly, the second subcomponent 14 further comprises at least one second planar or interface surface 18. The first and second planar surfaces 16, 18 are generally planar such that the interface surfaces 16, 18 can be positioned proximate to each other and affixed together to secure the first subcomponent 12 to the second subcomponent 14. In one aspect, the furniture item 10 can further comprise a third subcomponent 20 having a third interface surface 22 that can be positioned proximately to the first or second planar surfaces 16, 18. As depicted in FIG. 1, the third subcomponent 20 is the back rest.

As shown in FIGS. 1-12, the furniture item 10 can further comprise at least one component interface feature 24, each interface feature 24 comprising a retention element 26 affixed to the first planar surface 16 and a corresponding slot 28 defined in the second planar surface 18. Each retention element 26 comprises an axial portion extending outwardly from the first planar surface 16 and a radial portion extending transversely from the axial portion such that each retention element 26 can prevent movement of an engaged second subcomponent 14 from moving in at least two directions.

In one embodiment of the present invention, depicted in FIGS. 1-12, the retention element 26 can comprise a lug 30 having a cylindrical body 32 and an engagement feature 34 positioned at one end of the cylindrical body 32 and having a greater diameter than the cylindrical body 32. In one aspect, the interface feature 24 can further comprise a polymer liner 37 positioned within the slot 28. The polymer liner 37 can comprise a durable polymer that allows the lug 30 to slide easily along the slot 28 without gouging or denting the slot 28.

Figure 7:
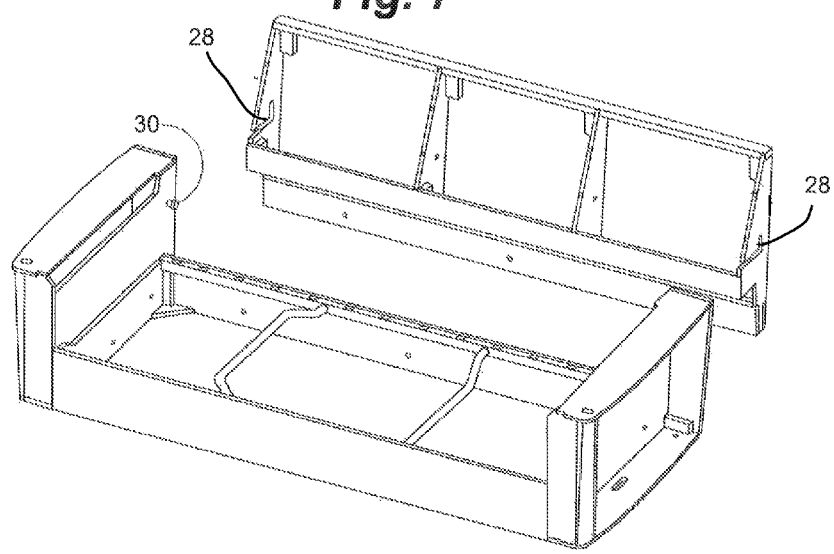
FIG. 7 is a partial exploded view of a furniture frame for a furniture item according to an embodiment of the present invention.
Figure 8:
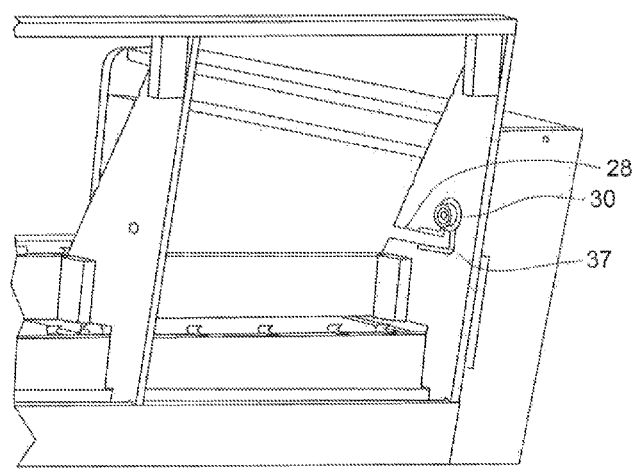
FIG. 8 is a partial rear perspective view of a furniture frame for a furniture item according to an embodiment of the present invention.
Figure 9:
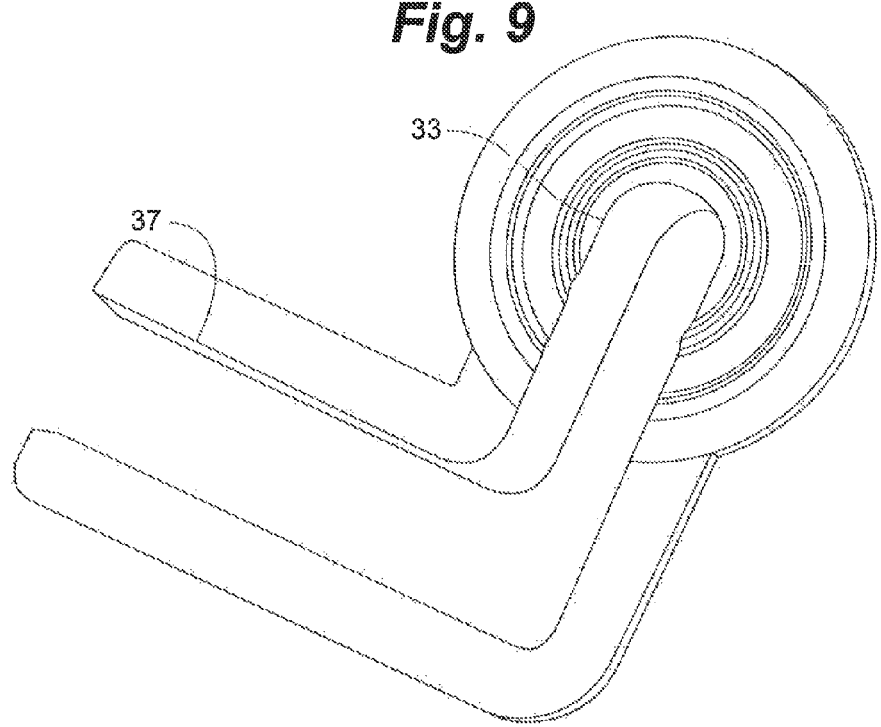
FIG. 9 is a perspective view of a polymer liner according to an embodiment of the present invention.
Figure 10:
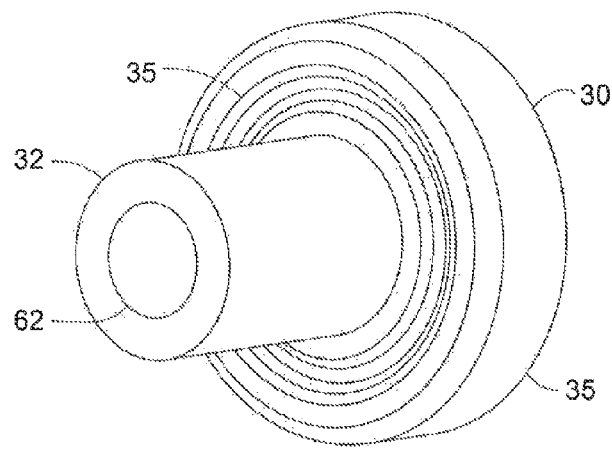
FIG. 10 is a perspective view of a lug according to an embodiment of the present invention.

The lug 30 is affixed to the first planar surface 16 at the end of the cylindrical body 32 opposite the engagement feature 34 such that the lug 30 extends perpendicularly from the first planar surface 16. As shown in FIGS. 9-10, in one aspect, the lug 30 can define a bore hole 62 for receiving a fastener 64 such as a screw, bolt, rivet or other conventional fastener for affixing the lug 30 to the first planar surface 16. The slot 28 begins at an edge of the first planar surface 16 and terminates at a predetermined point within the first planar surface 16. In one aspect, the slot 28 can be cut in the third interface surface 22 as shown in FIGS. 1 and 7-8. In operation, the second subcomponent 14 is maneuvered such that the end of the slot 28 is aligned with the lug 30 before the cylindrical body 32 of the lug 30 is slid into the slot 28 until the lug 30 reaches the end of the slot 28. In this aspect, the second subcomponent 14 can be the lighter than the first subcomponent 12 to avoid having the maneuver and position a larger component. The slot 28 is sized and positioned such that the first and second subcomponents 12, 14 are positioned in the proper alignment when the lug 30 reaches the end of the slot 28. The width of the slot 28 generally corresponds to the cylindrical body 32 such that the lug 30 cannot move perpendicular to the slot 28. The diameter of the engagement feature 34 is greater than the width of the slot 28 such that the first and second planar surfaces 16, 18 cannot be separated once the lug 30 is inserted into the slot 28.

In one aspect, the slot 28 can comprise at least a first linear segment 36 and a second linear segment 38 arranged in an L-shaped configuration. In this configuration, the first linear segment 36 begins at the edge of the second planar surface 18 and defines a generally horizontal axis, while the second linear segment 38 defines a generally vertical axis intersecting the horizontal axis defined by the first linear segment 36. In operation, the second subcomponent 14 is positioned to align the lug 30 with the first linear segment 38 and moved horizontally to slide the lug 30 into the slot 28. Once the lug 30 reaches the end of the first linear segment 38, second subcomponent 14 can be moved vertically to position the lug 30 at the end of the second linear segment 38. In one aspect, the second subcomponent 14 can be moved vertically by gravity to position the lug 30 at the end of the second linear segment 38 and slot 28. In this configuration, the vertical orientation of the second linear segment uses gravity to maintain the lug 30 at the end of the slot 28.

In one aspect, the polymer liner 37 can comprise a narrowed portion 40 proximate to the end of the slot 28. The narrowed portion 40 is narrower than the width of the slot 28 to grip the cylindrical body 32 once the lug 30 is positioned at the end of the slot 28 to prevent the lug 30 from moving backwards along the slot 28. In another aspect, the polymer liner 37 can comprise at least one protrusion 33 extending from the slot 28 to engage the lug 30 once the lug 30 reaches the end of the slot 28 to releasably secure the lug 30 at the end of the slot 28. Correspondingly, the engagement feature 34 can define a detent 35 for receiving the protrusion 33 to secure the lug 30 to the liner 37. In one aspect, the protrusion 33 can comprise a ring shape encircling the end of the slot 28 and having an opening corresponding to the slot 28.

In one aspect, as shown in FIG. 7, the furniture item 10 can comprise at least two component interface features 24 each having lugs 30 such that the two lugs 30 cooperate to prevent rotation of the second subcomponent 14 around the lug 30. As shown in FIG. 7, the at least two component interface features 24 can be arranged in parallel along a single vertical or horizontal axis. In this configuration, the third component 20 can be slid into engagement with a second subcomponent 14 on either side of the furniture item 10 at the same time. Alternatively, the at least two component interface features 24 can positioned in an offset configuration. In either configuration, the first and second linear segments 36, 38 of each component interface feature 24 are positioned in parallel to each other. In another aspect, the furniture item 10 can comprise a secondary interface feature 42 that cooperates with the primary interface feature 24 in affixing the first and second subcomponents 12, 14 and prevents rotation of the second subcomponent 14 around the lug 30.

As shown in FIGS. 13-25, the retention element 26 can comprise an elongated bracket 44 having an elongated body 46 defining a first face 48 and a second face 50 opposite the first face 48. The elongated bracket 44 can further comprise a lip 52 protruding radially outward from the elongated bracket 44 and extending at least partially around the second face 50. In one aspect, the elongated bracket 44 can comprise a durable injection moldable polymer material that is lighter than conventional metal materials. For example, nylons, polyethelenes, polyesters, PBT, PET, and such materials with fillers. The brackets also may be formed of metals such as steel, aluminum and alloys. The first face 48 of the elongated bracket 44 is affixable to the first planar surface 16 such that the elongated bracket 44 extends from the first planar surface 16. In one aspect, the elongated bracket 44 can comprise a tapered edge 58 such that the elongated bracket 44 comprises a trapezoidal cross-section. In this configuration, the elongated bracket 44 can comprise a plurality of ribs 60 for reinforcing the elongated bracket 44. The ribs are configured as gussets As shown in FIGS. 20 to 23, the elongated bracket 44 can further comprise at least one bore hole 66 for receiving a fastener 68 for affixing the elongated bracket 44 to the first planar surface 16.

In operation, the elongated bracket 44 is aligned and inserted into the slot 28. The slot 28 is sized to engage the edge of the elongated bracket 44 once the elongated bracket 44 is inserted into the slot 28 to prevent perpendicular movement of the elongated bracket 44 relative to the slot 28. The slot 28 is positioned such that the first and second subcomponents 12, 14 are properly aligned when the elongated bracket 44 reaches the end of the slot 28. The elongated body 46 engages the slot 28 along the length of the slot 28 to prevent rotation of the first subcomponent 12 relative to the second subcomponent 14. The outer diameter of the lip 52 is greater than the width of the slot 28 to engage the first subcomponent 12 to the second subcomponent 14 once the elongated bracket 44 is inserted into the slot 28.

Figure 14:
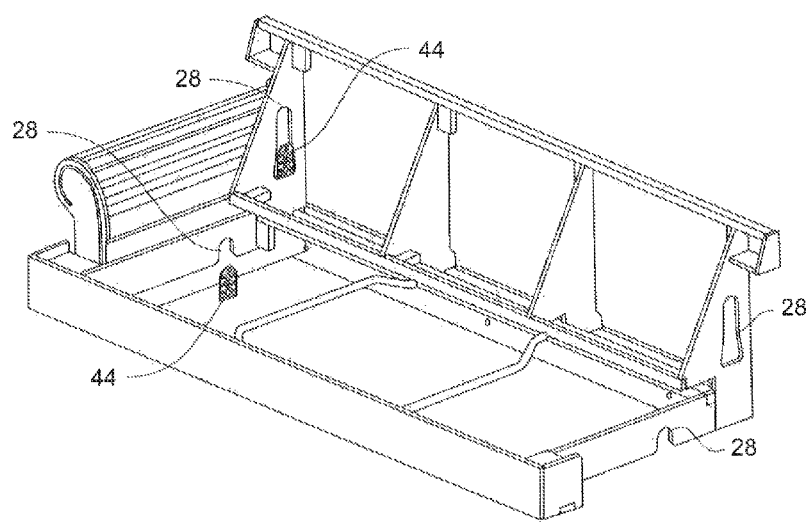
FIG. 14 is a partial front perspective view of the furniture frame depicted in FIG. 9 illustrating the engagement of the subcomponents of the furniture frame.
Figure 15:
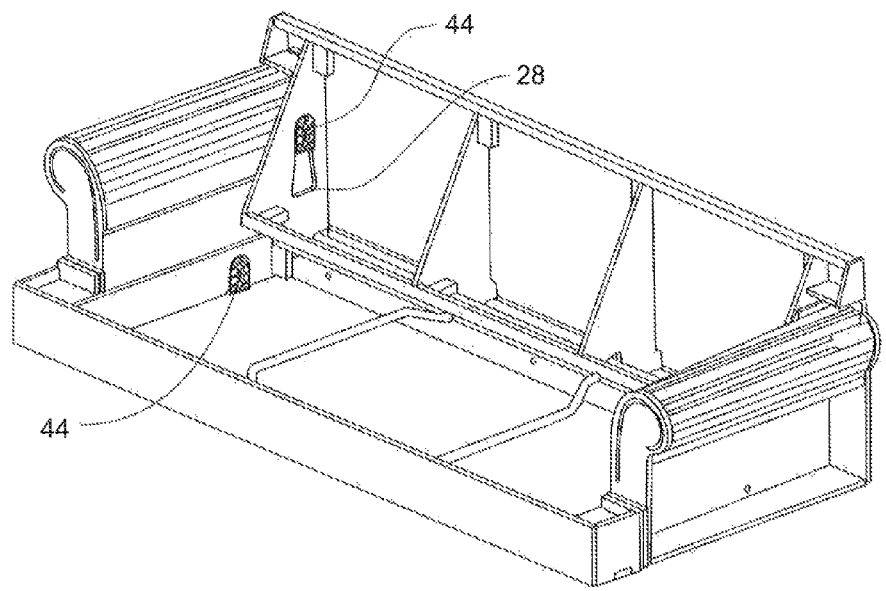
FIG. 15 is a partial front perspective view of the furniture frame depicted in FIG. 9 illustrating the engagement of the subcomponents of the furniture frame.
Figure 16:
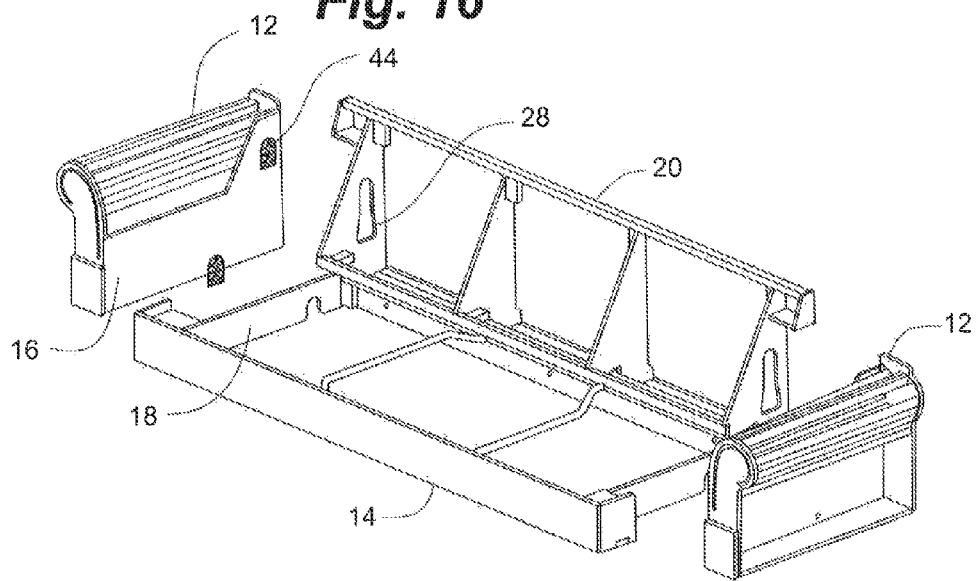
FIG. 16 is an exploded perspective view of the furniture frame depicted in FIG. 9.
Figure 17:
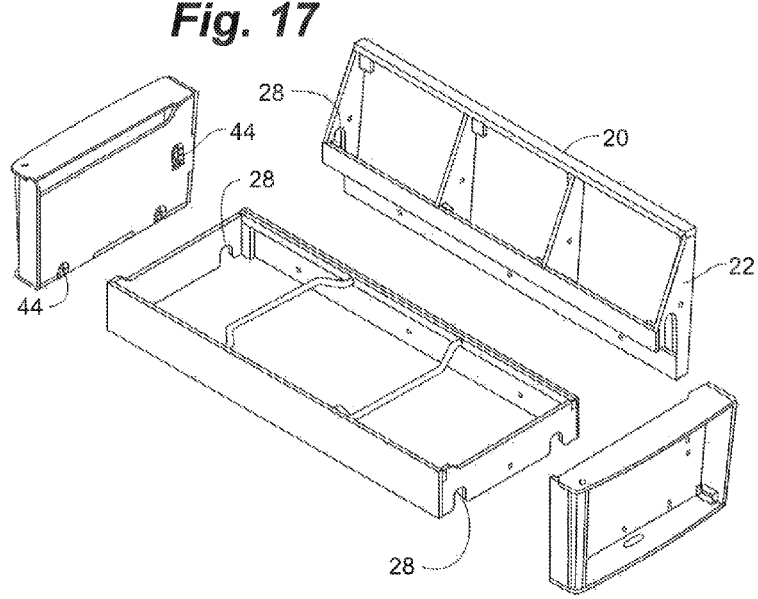
FIG. 17 is a front perspective view of an un-upholstered furniture frame for a furniture item according to an embodiment of the present invention.
Figure 18:
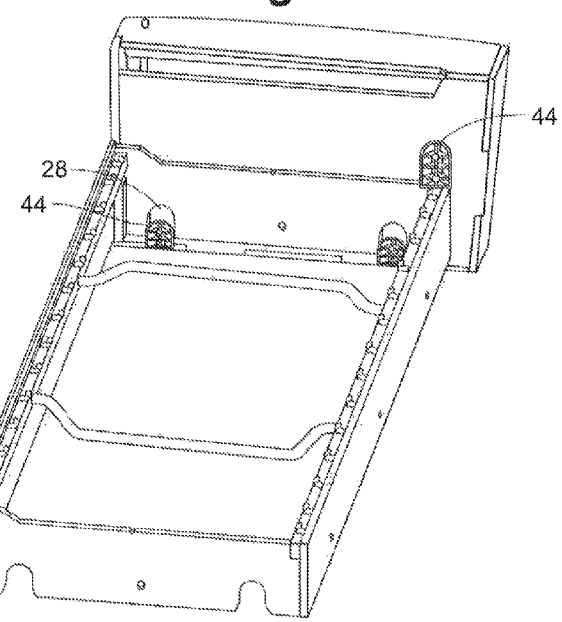
FIG. 18 is a partial side perspective view of the furniture frame depicted in FIG. 17 illustrating the engagement of the subcomponents of the furniture frame.
Figure 19:
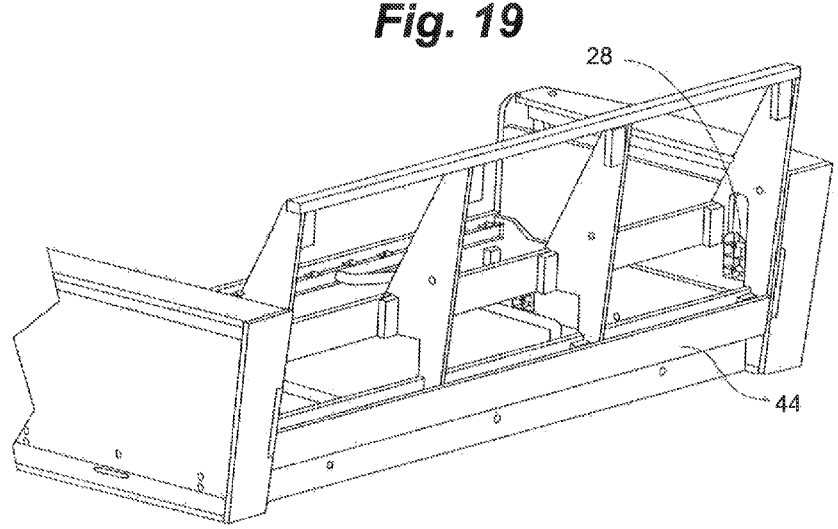
FIG. 19 is a partial rear perspective view of the furniture frame depicted in FIG. 17.

In one aspect, as shown in FIGS. 14 and 15, the slot 28 can be tapered such that a portion of the slot 28 has a width greater than the width of the lip 52 such that the elongated bracket 44 can be threaded through the slot 28. In operation, a first subcomponent 12 having an elongated bracket 44 can be maneuvered such that the elongated bracket 44 is threaded through the slot 28 and slid such that the elongated bracket 44 engages the narrower portion of the slot 28 to attach the first subcomponent 12 to the second subcomponent 14 as shown in FIG. 14.

In one aspect, the slot 28 can comprise a third linear segment 54 extending vertically from the bottom of the second planar surface 18. In this configuration, the second subcomponent 14 is positioned to align the slot 28 with the elongated bracket 44 and lowered to slide the elongated bracket 44 into the slot 28. The second subcomponent 14 can be lowered manually or with the assistance of gravity simplifying the interlocking process. In one aspect, the elongated bracket 44 can further comprise a rounded end 56 for aligning the elongated bracket 44 with the slot 28 as the first component 16 is lowered onto the elongated bracket 44.

In one aspect, as shown in FIGS. 13-19, the furniture item 10 can comprises a plurality of brackets 44 that cooperate to engage the subcomponents 12, 14, 20 together. The plurality of brackets 44 can be arranged along a single horizontal or vertical axis. In one aspect, one or more brackets 44 can be offset from the brackets 44 arranged along a horizontal or vertical axis. In either configuration, the corresponding slots 28 can be oriented in parallel such that the subcomponents 12, 14, 20 can be slid along a single axis to be engaged together as shown in FIGS. 13-14.

Figure 28:
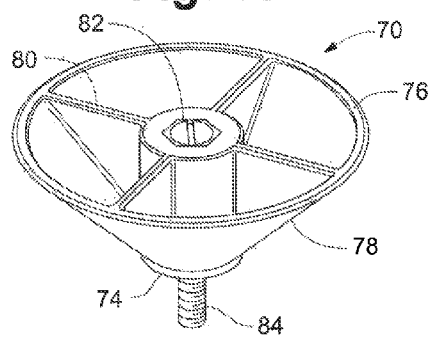
FIG. 28 is a perspective view of a frustoconical bracket according to an embodiment of the present invention.
Figure 29:
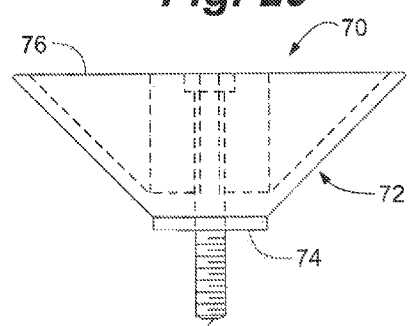
FIG. 29 is partial cross-sectional side view of the frustoconical bracket depicted in FIG. 28.
Figure 30:
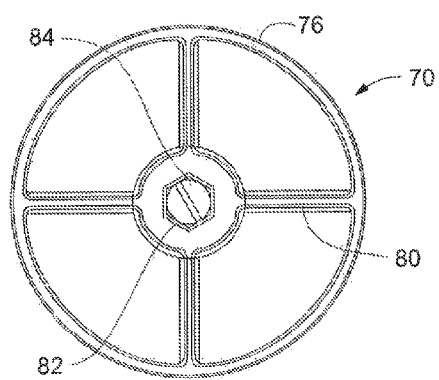
FIG. 30 is top view of the frustoconical bracket depicted in FIG. 28.

As shown in FIGS. 28-30, the retention element 26 can comprise a frustum shaped, for example, a frustoconical shaped, bracket 70 having a frustoconical body 72 defining a first face 74 and a second face 76 opposite the first face 74. The first face 74 has a smaller cross-sectional spanning area than the second face 76. The frustoconical body 72 defines a frustum surface, a tapered surface 78 on the periphery of the frustoconical body 72 and extending between the first and second faces 74, 76 at constant slope, as shown in e.g. FIGS. 28-29, such that the frustoconical body 72 comprises a trapezoidal cross-section at planes perpendicular to the first and second surfaces. The first face 74 of the frustoconical bracket 70 is affixable to the first planar surface 16 of the subcomponent such that the frustoconical body 72 extends from the first planar surface 16. In one aspect, the frustoconical bracket 70 can comprise a plurality of ribs 80 for reinforcing the tapered wall with the tapered surface 78 of the frustoconical bracket 70. As shown in FIGS. 28-30, the frustoconical bracket 70 can further comprise at least one bore hole 82 for receiving a fastener 84 for affixing the elongated bracket 44 to the first planar surface 16.

Figure 26:
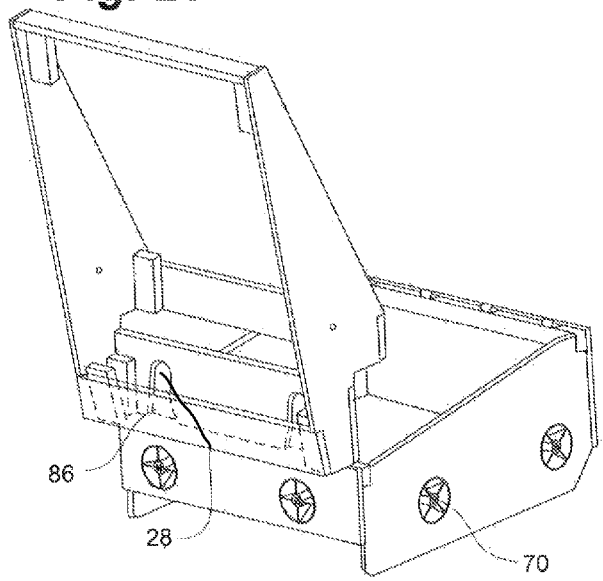
FIG. 26 is a rear perspective view of an un-upholstered furniture frame for a furniture item according to an embodiment of the present invention.
Figure 27:
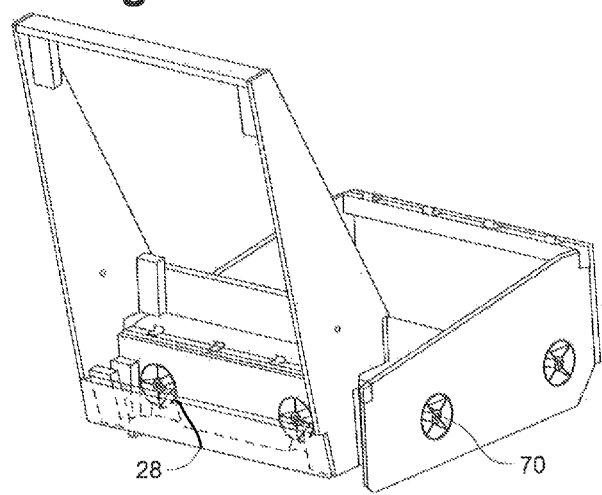
FIG. 27 is a rear perspective view of the furniture frame depicted in FIG. 26 illustrating the engagement of the subcomponents of the furniture frame.

As shown in FIGS. 26-27, in operation, the frustoconical bracket 70 is aligned and inserted into the slot 28. The slot 28 is sized to engage the tapered surface 78 of the frustoconical bracket 70 as the frustoconical bracket 70 is inserted into the slot 28 to prevent movement of the frustoconical bracket 70 perpendicular to the slot 28. The slot 28 is positioned such that the first and second subcomponents 12, 14 are properly aligned when the elongated bracket 44 reaches the end of the slot 28. In one aspect, a pair of frustoconical brackets 70 is positioned on the first planar surface 16 to prevent rotation of the second subcomponent 14 around the frustoconical bracket 70. The outer diameter of the second face 76 is greater than the width of the slot 28 to engage the first subcomponent 12 to the second subcomponent 14 once the frustoconical bracket 70 is inserted into the slot 28.

In one aspect, the slot 28 can comprise a third linear segment 54 extending vertically from the bottom of the second planar surface 18. In this configuration, the second subcomponent 14 is positioned to align the slot 28 with the frustoconical bracket 70 and lowered to slide the frustoconical bracket 70 into the slot 28. The second subcomponent 14 can be lowered manually or with the assistance of gravity simplifying the interlocking process. The rounded shape of the frustoconical bracket 70 can engage the edges of the slot 28 to align the frustoconical bracket 70 with the slot 28 as the first subcomponent 12 is lowered onto the frustoconical bracket 70. In one aspect, the slot 28 can comprise a tapered edge 86 to engage the frustoconical bracket 70 to align the second subcomponent 14 with the first subcomponent 12 as the second subcomponent 14 is lowered onto the first subcomponent 12.

Figure 31:
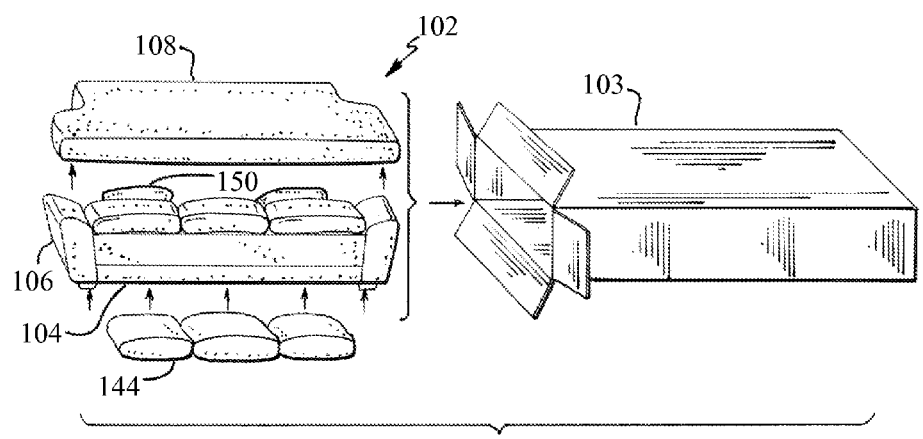
FIG. 31 is a representative diagram depicting the packaging a ready to assemble furniture kit according to embodiment of the present invention.
Figure 45:
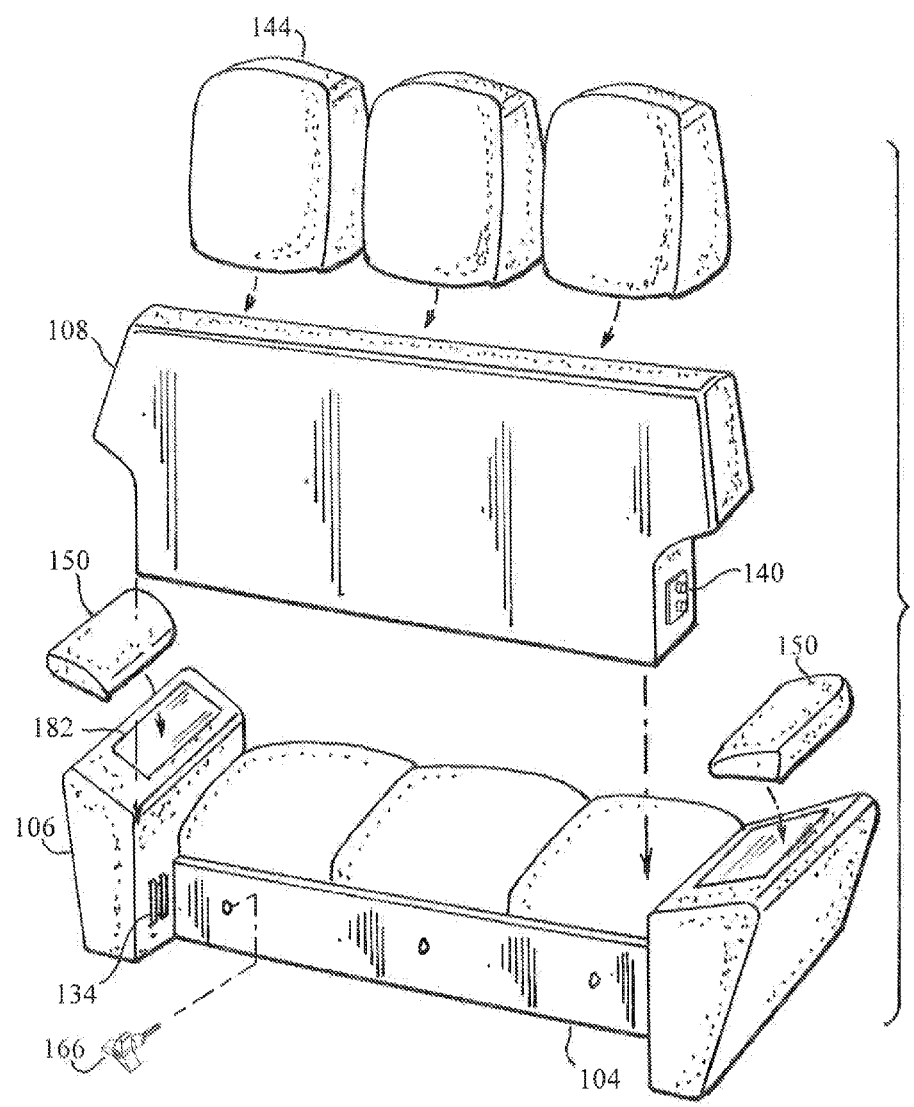
FIG. 45 is a diagram view of depicting assembly of a ready to assembly furniture kit according to an embodiment of the present invention.

As shown in FIGS. 31 and 45, a ready to assembly furniture item 102, according to an embodiment of the present invention, a seat box 104 with at least one integrated arm rest 106 and a back rest 108. As depicted, the item 102 is for assembly of a sofa, but can be for any number of conventional furniture types including, for example, chaises, sectionals, love seats, chairs, benches, or recliners. As shown in FIG. 31, the entire item 102 can be packaged into a single box 103.

As shown in FIGS. 32-33 and 35, the seat box 104, according to an embodiment, can comprise a rectangular frame 110 having two opposing walls 112 and two end walls 114. Each end wall 114 can further define at least one cut out 116. According to an embodiment, the seat box 104 can further comprise an upper support assembly 118 having a support surface 120 and at least one spring 122 tensioned between the opposing walls 112. The upper support assembly 118 is positioned on the rectangular frame 110 to define a cavity within the seat box 104. According to an embodiment, the seat box 104 can further comprise at least one seat cushion 124 affixed to the exterior of the upper support surface 120.

Figure 41:
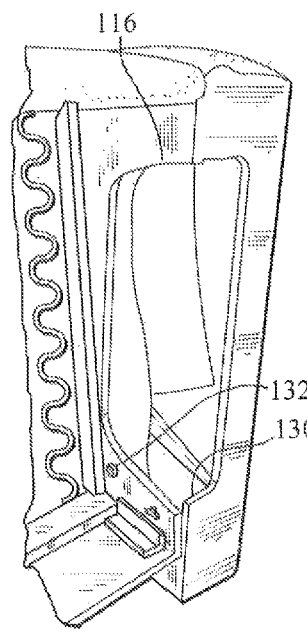
FIG. 41 is a bottom partial perspective view of the arm rest-seat box assembly depicted in FIG. 39.

As shown in FIGS. 36-38, the arm rest 106, according to an embodiment, comprise a frame 126 having an interface plate 128. The frame 126 defines a cavity within the arm rest 6 that can be used to retain furniture components during shipment of the item 102. The interface plate 128 can define a cutout 130 corresponding to the cut out 116 in the end walls 114. As shown in FIGS. 39 and 41, the interface plate 128 can be aligned with the end walls 114 such that the arm rests 106 can be affixed to the seat box 104 by inserting at least one fastener 132 through the end wall 114 and interface plate 128.

Figure 40:
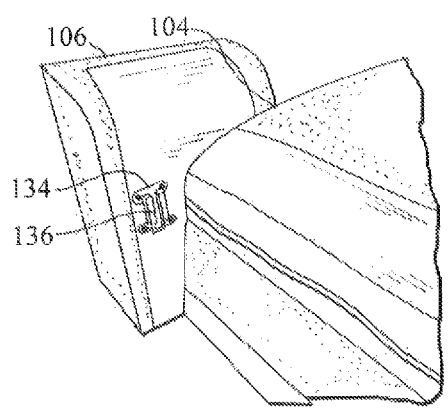
FIG. 40 is a rear partial perspective view of the arm rest-seat box assembly depicted in FIG. 39.

As shown in FIG. 40, each arm rest 106 can further comprise an alignment bracket 134 defining an elongated u-shaped notch 136. The arm rest 6 is mounted to the seat box 104 such that a portion of the arm rest 106 protrudes past the seat box 104. According to an embodiment, the alignment bracket 134 is positioned within the portion of the arm rest 106 that protrudes past the seat box 104.

As shown in FIG. 45, each arm rest 106 can further comprise at least one arm rest cushion 150. The arm rest 106 can further comprise at least one releasable engagement feature 152 for engaging the arm rest cushion 150 to the arm rest 106. The engagement feature 152 can comprise a zipper, VELCRO or other conventional means of releasably affixing a cushion.

Figure 42:
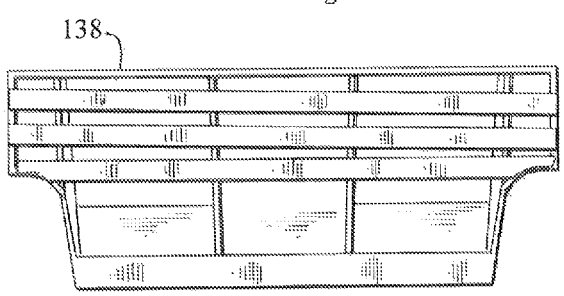
FIG. 42 is a rear perspective view of a back rest frame for a ready to assemble furniture kit according to an embodiment of the present invention.
Figure 43:
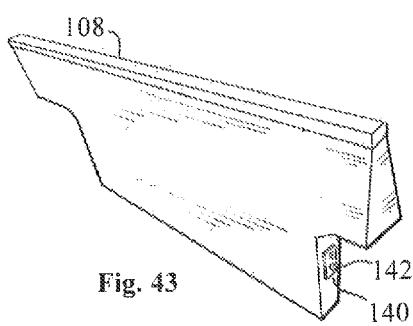
FIG. 43 is a rear perspective view of a back rest for a ready to assemble furniture kit according to an embodiment of the present invention.
Figure 44:
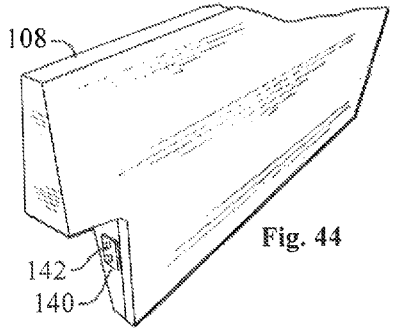
FIG. 44 is an enlarged partial rear perspective view of the back rest depicted in FIG. 43.

As shown in FIGS. 42-44, the back rest 108 can further comprise a frame 138 and at least one alignment bracket 140 corresponding to each alignment bracket 134 of each arm rest 106. Each alignment bracket 134 further comprises at least one t-shaped knob 142 receivable within the u-shaped notch 136 of the arm rest alignment bracket 134. According to an embodiment, the alignment bracket 134 can further comprise at least two t-shaped knobs 142 receivable within each u-shaped notch 136 to prevent torqueing of the back rest 108 once the back rest 108 is fitted to the arm rest 106 and seat box 104 assembly. The back rest 108 can further comprise at least one removable back cushion 144 each having an engagement feature 148 such as a zipper, VELCRO or other conventional means for releasably affixing the back rest cushion 144 to the back rest frame 38.

As shown in FIG. 45, the item 102 is assembled by sliding the back rest 108 between the protruding portions of the arm rests 106 such that t-shaped knobs 142 slide into the corresponding u-shaped notches 136. The back rest cushions 144 and arm rest cushions 150 can be removed from the seat box 104 and arm rest 106 cavities before being be affixed to the back rest 108 and arm rest 106, respectively.

Figure 46:
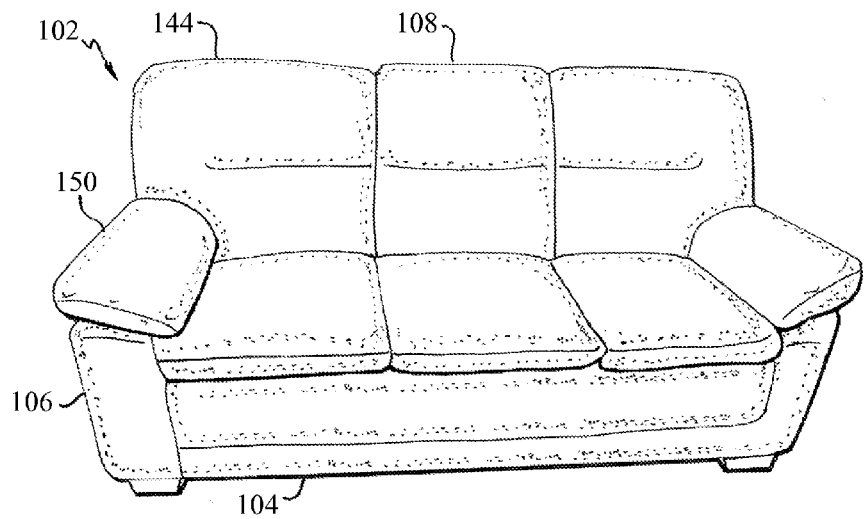
FIG. 46 is a perspective view of a furniture item assembled from a ready to assemble furniture kit according to an embodiment of the present invention.

According to an embodiment, as shown in FIGS. 46-47, the arm rest 106 can further comprise an alignment bracket 154 defining a track 156 and having at least two walls 158 extending along the track 156. Similarly, the back rest 108 can further comprise an alignment bracket 160 similarly defining a track 162 and having at least two walls 164 extending along the track 158. The arm rest alignment bracket 154 and the back rest alignment bracket 160 can be affixed by sliding the corresponding walls 158, 164 along a first axis. The walls 158, 164 are shaped to prevent movement of the alignment brackets 154, 160 relative to each other in any direction except along the sliding axis. According to an embodiment, the arm rest alignment bracket 154 can comprise at least one stop 186 positioned within the track 156 to prevent sliding of the back rest 108 past a predetermined point.

According to an embodiment, the furniture item 102 can further comprise at least one manual handled threaded fastener 66. Each manual handled threaded fastener 166 can further comprise an elongated threaded shank 168 and a handle 170 for rotating the shank 168. In this configuration, the back rest 108 can further comprise a bushing assembly 172 having a bushing portion 174 with a threaded interior and at least one engagement feature 176. The bushing portion 174 is inserted into a bore hole 178 that is positioned proximate to the set box 104 when the back rest 108 is fitted to the seat box 104. The engagement feature 176 is adapted to engage the frame 138 of the back rest 108 to maintain the bushing portion 174 within the bore hole 178. The manual handled threaded fastener 66 can be threaded through a bore hole 180 in the corresponding opposing wall 112 of the seat box 4 and into the bushing portion 174 to affix the back rest 8 to the seat box 104.

According to an embodiment, the seat box 104 can further comprise a sealing feature 182 engagable to a corresponding sealing feature 184 on the back rest 108. The sealing features 182, 84 can comprise a zipper, VELCRO or other conventional means of engaging the seat box 4 and back rest 108. The sealing features 182, 184 can be engaged to seal any gaps between the seat box 104 and the back rest 108 are joined.

Figure 20:
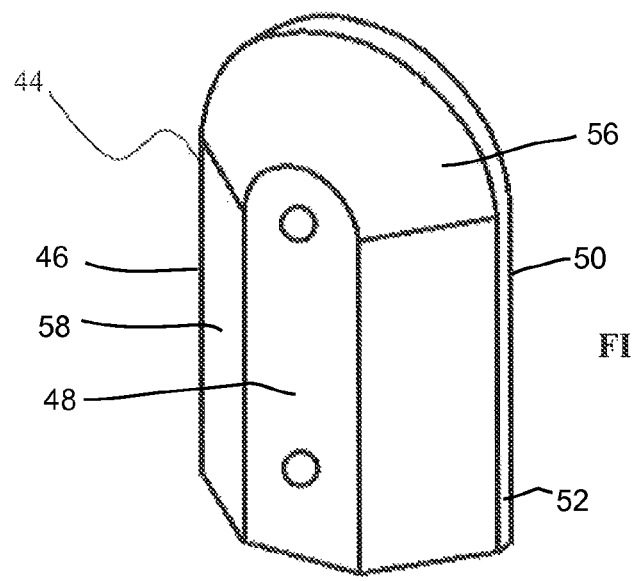
FIG. 20 is a front perspective view of an elongated bracket according to an embodiment of the present invention.
Figure 21:
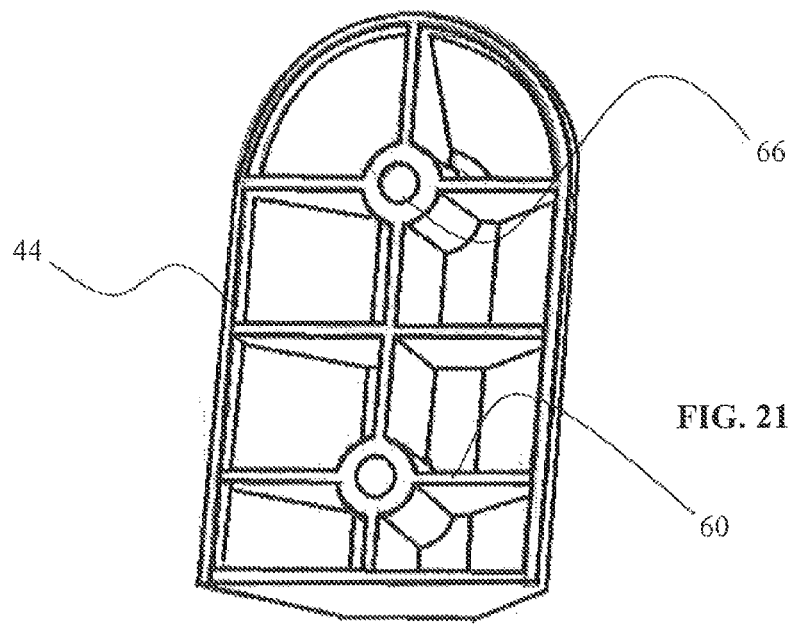
FIG. 21 is a rear perspective view of the elongated bracket depicted in FIG. 20.
Figure 22:
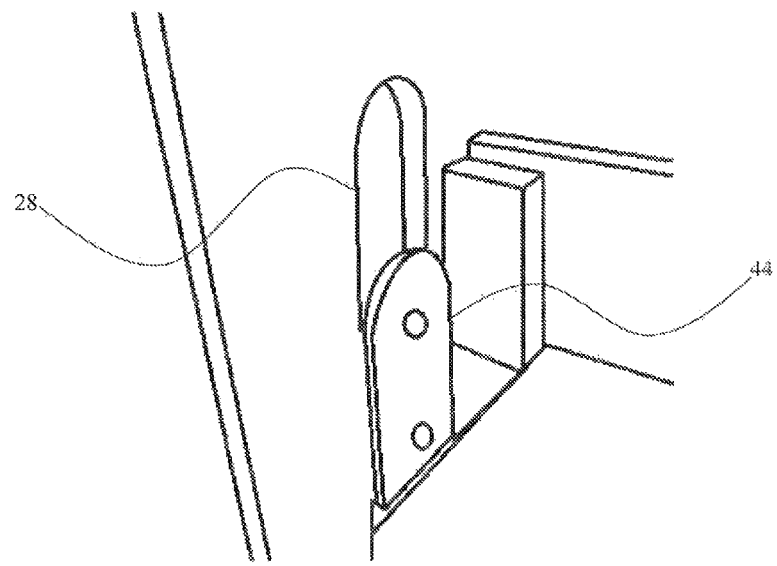
FIG. 22 is a perspective view of an elongated bracket travelling vertically along a slot to engage the subcomponents together.
Figure 23:
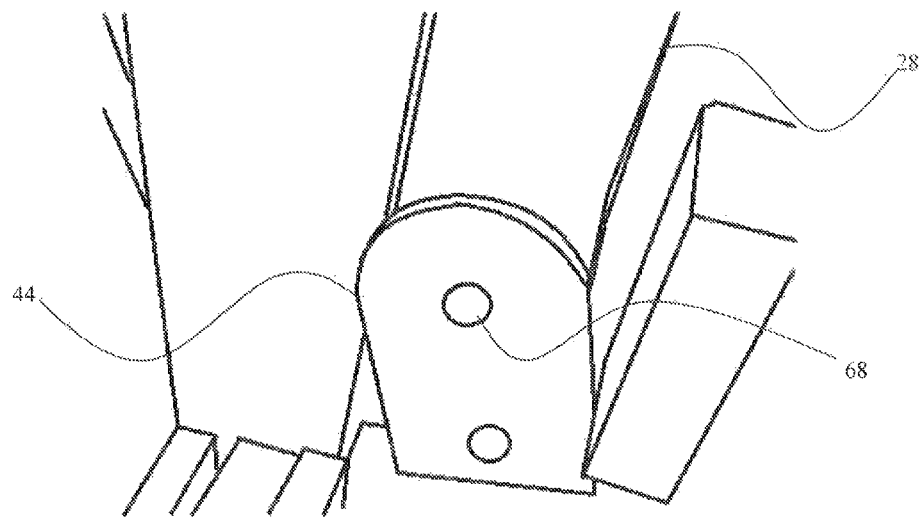
FIG. 23 is a perspective view of the bracket depicted in FIG. 22 illustrating the elongated bracket correcting misalignment of the subcomponents.
Figure 24:
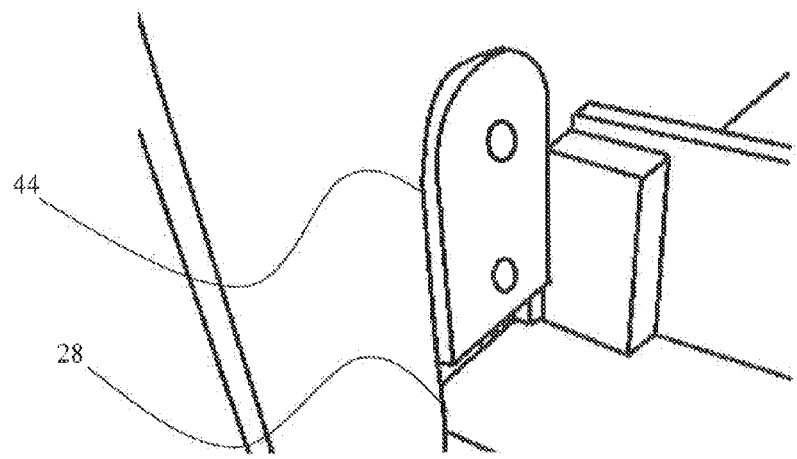
FIG. 24 is a front perspective view of the elongated bracket depicted in FIG. 22 engaging the end of the slot to lock the subcomponents together.
Figure 25:
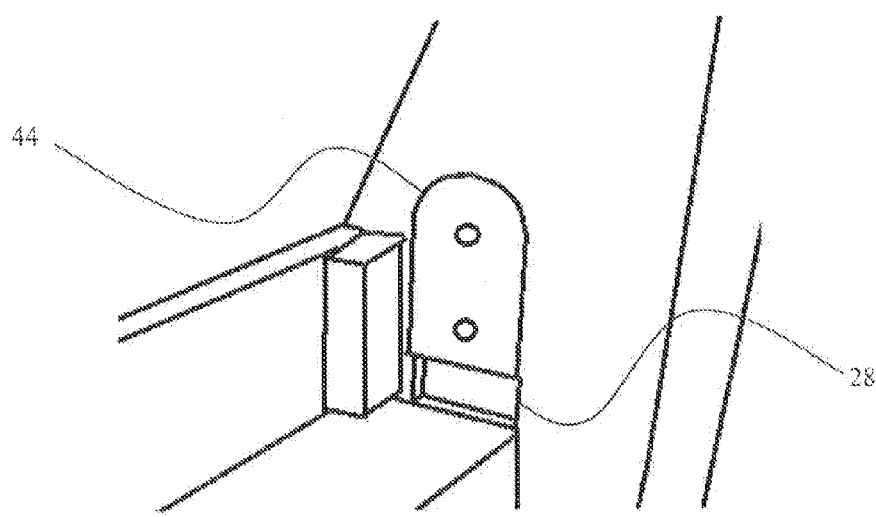
FIG. 25 is a rear perspective view of the elongated bracket depicted in FIG. 22 engaging the end of the slot to lock the subcomponents together.

As depicted in FIG. 50, according to an embodiment of the present invention, the RTA furniture item 10 comprises a connection bracket 200 affixed to the first planar surface 16 of the first subcomponent 12 and a slot 202 defined in the second planar surface 18 of the second subcomponent 14. In one aspect, the connection bracket 200 can comprise a conical frustum portion as shown in FIGS. 28-30. In another aspect, the connection bracket 200 can comprise a rectangular pyramidal frustum portion. As shown in FIGS. 20-21, in yet another aspect, the connection bracket 200 can comprise a rectangular pyramidal frustum portion combined with a conical frustum portion, such that the bracket 200 comprises the shape of an arched doorway. As depicted in FIGS. 50 and 51, the connection bracket 200 comprises an inwardly facing lesser spanning area 204, an outer facing greater spanning area 206 and a tapered frustum surface 208 extending there between. In one aspect, the bracket 200 can comprise an injection molded plastic or metal.

In operation, the lesser spanning area 204 is secured to the first planar surface 16 of the first subcomponent 12 such that the greater spanning area 206 is opposite the first planar surface 16. In one aspect, the first subcomponent 12 is secured to the second subcomponent 14 by inserting the connection bracket 200 into the slot 202 such that the frustum surface 208 engages the edges of the slot 202. The slot 202 is dimensioned to having a cooperating fit between the slot 202 and the frustum surface 208. In one aspect, the slot 202 is dimensioned such that the cooperating fit is an interface fit. The frustum surface 208 is angled to prevent movement of the first subcomponent 12 relative to the second subcomponent 14 transverse slot 202. Similarly, the angle of the frustum surface 208 prevents the first subcomponent 12 from being pulled apart from the second subcomponent 14. In one aspect, the edges of the slot 202 are deformed by the bracket 200 as the bracket 200 is inserted into the slot 202.

As depicted in FIG. 51, in one aspect, the connection bracket 200 can comprise a shaft portion 210 having a first end 212 secured to the first planar surface 16 and a second end 214, wherein an knob portion 216 having an engagement surface 218 affixed to the second end 214 such that the engagement surface 218 is oriented toward the first planar surface 16. In this configuration, the slot 202 is sized having a cooperating fit with the shaft portion 210 such that the shaft portion 210 cannot move transversely to the slot 202 once the shaft portion 210 is inserted into the slot 202 to secure the first and second subcomponents 12, 14.

In one aspect, the second subcomponent 14 can further comprise a slot lining receiver 220 positioned within the slot 202 and having a pair of opposing walls 222 defining a receiving slot 224 and a retention portion 226 on the second planar surface 18 for engaging the engagement surface 218. Upon insertion of the shaft 210 into the slot 224, the engagement surface 218 of the knob portion 216 engages the retention portion 226 to fix the shaft 210 within the slot 224 and secure the first subcomponent 12 to the second subcomponent 14.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. Ready to assemble furniture item comprising a pair of furniture components to be assembled together as part of the furniture item, the pair of components comprising a first subcomponent with a first planar face and a second subcomponent with a second planar face, the components assembled together whereby the first planar face is in a parallel confronting position with the second planar face, the first subcomponent comprising a connection bracket connected thereto and having at least one of a tapered conical frustum portion and a tapered rectangular pyramidal frustum portion, the connection bracket having an inwardly facing face with a lesser spanning area and having surface regions abutting the first planar face, an opposite outer facing face having greater spanning area, and a tapered frustum engagement surface extending therebetween, the second subcomponent having a slot in the second planar face sized for a cooperative engagement with the at least one of a tapered conical frustum portion and a tapered rectangular pyramidal frustum portion, whereby the first subcomponent is assembleable with the second subcomponent by insertion of the bracket of the first subcomponent into the slot of the second subcomponent, each of the pair of components being a preassembled one of a chair arm, chair seat base, and chair back, wherein each of the pair of components comprises a wood or wood product box framed component, and wherein the outer facing face of the bracket has the shape of an arched doorway.

2. Ready to assemble furniture item comprising a pair of furniture components to be assembled together as part of the furniture item, the pair of components comprising a first subcomponent with a first planar face and a second subcomponent with a second planar face, the components assembled together whereby the first planar face is in a parallel confronting position with the second planar face, the first subcomponent comprising a connection bracket connected thereto and having at least one of a tapered conical frustum portion and a tapered rectangular pyramidal frustum portion, the connection bracket having an inwardly facing face with a lesser spanning area and having surface regions abutting the first planar face, an opposite outer facing face having greater spanning area, and a tapered frustum engagement surface extending therebetween, the second subcomponent having a slot in the second planar face sized for a cooperative engagement with the at least one of a tapered conical frustum portion and a tapered rectangular pyramidal frustum portion, whereby the first subcomponent is assembleable with the second subcomponent by insertion of the bracket of the first subcomponent into the slot of the second subcomponent, each of the pair of components being a preassembled one of a chair arm, chair seat base, and chair back, wherein each of the pair of components comprises a wood or wood product box framed component, and wherein the bracket has the shape of half of a conical frustum joined with a pyramidal rectangular frustum.

3. Ready to assemble furniture item comprising a pair of furniture subcomponents to be assembled together as part of the furniture item, each of the pair of subcomponents comprising a box frame formed of a plurality of members selected from boards and panelar members, each of the members formed of at least one of wood and wood based products, the subcomponents comprising a first subcomponent with a first planar face and a second subcomponent with a second planar face, the components assembleable together whereby the first planar face is in a parallel confronting position with the second planar face, the first subcomponent comprising a connection bracket connected thereto on the first planar face, the connection bracket having a slot engagement portion and a widened portion, the second subcomponent having a slot formed in the second planar face in a second subcomponent board or panelar member, the slot extending through a thickness of the second subcomponent board or panelar member, the slot sized for receiving the connection bracket and providing a slot end for a seating position for the connection bracket;

further wherein after assembly, the first planar face is in contact engagement with the second planar face and the ready to assemble furniture item further comprises fasteners extending through the first planar face and second planar face for securing the pair of subcomponents together;

further wherein one of the first and second subcomponents is a chair arm and the other of the first and second subcomponents is a chair base.

4. The ready to assemble furniture item of claim 3 wherein the slot is one of key-hole shaped and L-shaped.

5. The ready to assemble furniture item of claim 3 wherein the first planar face is part of a first subcomponent board or panelar member and both of the first subcomponent board or panelar member and the second board or panelar member each have a common cutout portion for creating an expanded storage region on the bottom side of the furniture item when assembled.

6. A ready to assemble furniture item comprising:
a plurality of subcomponents comprising at least one seat box defining an internal cavity, at least one arm rest, and a back rest;
at least one component interface assembly further comprising:
a retention element having an axial portion extending outwardly from a first subcomponent and a radially extending portion extending radially outward at the end of the axial portion, and an alignment slot defined by an interface portion of a second subcomponent of the plurality of subcomponents and having an open end and a closed end, wherein the axial portion is insertable into the alignment slot such that the interface portion is sandwiched between the radially extending portion and the second subcomponent, wherein a first segment of the alignment slot is vertically oriented at the closed end when the second subcomponent is positioned upright such that the weight of the second subcomponent maintains the retention element against the closed end of the alignment slot to secure the first and second subcomponents together;

wherein the first subcomponent is the back rest and the second subcomponent is the seat box.

7. A ready to assemble furniture item comprising:

a plurality of subcomponents comprising at least one seat box defining an internal cavity, at least one arm rest, and a back rest;

at least one component interface assembly further comprising:
- a retention element having an axial portion extending outwardly from a first subcomponent and a radially extending portion extending radially outward at the end of the axial portion, and
- an alignment slot defined by an interface portion of a second subcomponent of the plurality of subcomponents and having an open end and a closed end, wherein the axial portion is insertable into the alignment slot such that the interface portion is sandwiched between the radially extending portion and the second subcomponent, wherein a first segment of the alignment slot is vertically oriented at the closed end when the second subcomponent is positioned upright such that the weight of the second subcomponent maintains the retention element against the closed end of the alignment slot to secure the first and second subcomponents together;

wherein the first subcomponent and second subcomponent comprise an arm rest and a seat box and wherein each arm rest defines a cavity within the arm rest and a cutout for operably linking the cavity defined by the arm rest with the cavity defined by the seat box.

* * * * *